Patented Oct. 25, 1932

1,884,542

UNITED STATES PATENT OFFICE

JOHN F. BLYTH, OF NEWARK, AND CARLETON ELLIS, OF MONTCLAIR, NEW JERSEY, ASSIGNORS TO CHADELOID CHEMICAL COMPANY, OF NEW YORK, N. Y., A CORPORATION OF WEST VIRGINIA

MAKING ARSENICAL INSECTICIDES

No Drawing.   Application filed October 24, 1927. Serial No. 228,491.

The present invention relates to the manufacture of arsenical products suitable for use as insecticides, and this application contains matter continued from our prior application Number 314 filed January 3, 1925.

The present invention relates to the production of arsenical compounds suitable for use as insecticides, and involves such improvements in the manufacture of arsenite compounds of lime, which are very bulky and which contain a large percentage of insoluble arsenic compounds, and which contain an extremely low percentage of water-soluble arsenic compounds. The product consists largely, but if not entirely of normal calcium arsenite, and herein we will employ the term "arsenite of lime", since it is not pretended that the product of the present invention is chemically pure.

An efficient insecticide, as we understand it, is one which is sufficiently stable not to decompose so fast as to burn the foliage of the plant, and yet is sufficiently unstable to break down inside the organism of the insect. The percentage of water-soluble arsenic compounds in an insecticide is generally considered a criterion of its burning power on the foliage. It is desirable that a small amount of water-soluble arsenic compounds be present especially for use against insects like the cotton boll weevil which puncture the foliage and suck the juice (as distinguished from insects which actually consume the foliage). Insects of the sucking type are poisoned partly by the water-soluble arsenic compounds which dissolve in the drops of dew or rain on the foliage, and partly by the fine particles of insoluble arsenic compounds suspended in these fine drops of water when the insects drink them.

However attention is called to the fact that the soluble arsenic in the product must be very low otherwise the insecticide will be highly injurious to the foliage, and may kill the plant if the soluble arsenic is relatively high in the insecticide. It is usually desirable to have the soluble arsenic in the insecticide well below 1%, and preferably below ½%, to avoid injury to the vegetation.

In accordance with the present invention it is possible to carry out a process of slaking quick lime in the presence of arsenic trioxide with a certain proportion of water in a manner which yields a product unusually low in water-soluble arsenic compounds and in the form of a finely-divided voluminous powder which for most commercial requirements needs no further drying but which may be passed through a disintegrator or air separator before packaging if desired.

In a preferred form of carrying out the process, we employ a continuous operation, the lump lime being fed into an agitating conveyer or a trough provided with an agitator and conveyer, say at one end, water and arsenic trioxide being introduced, either together or separately, and the agitation being continued until the reaction is sufficiently complete, to leave a substantially dry-appearing material, in a relatively light and fluffy character, which may be then passed through the disintegrator or air-separator as above referred to.

In one form of carrying out the process, the lime may be introduced in the form of lumps of convenient size (say from ½ inch to 6 inch lumps), into a tumbling barrel and water may be sprayed upon the lime, either cold water or hot water being used. The agitation produced in the tumbling barrel is sufficient to reduce this to a mixture of powdered quick lime and powdered hydrated lime, which may also carry more or less lumps if desired. The quantity of water to be used can vary more or less, and when using cold or hot water, about 10 to 25 pounds of water may be used per 100 pounds of the lump lime. This operation may be conducted either continuously or intermittently as desired, and a portion of the lump lime may become slaked and disintegrated by the steam liberated in this reaction. Obviously an outlet should be provided for steam, from the said barrel.

The mixture of slaked or unslaked lime, mostly in a pulverulent state then may pass into an elongated conveyer, in which a suspension of white arsenic in water is sprayed upon the same, this operation likewise being preferably conducted in a continuous manner. The amount of water used in this step should be sufficient to complete the hydration of the lime, and preferably some excess is used. Heat may also be given off during this process and the steam liberated, together with air introduced at the exit end of the device may travel into and through the tumbling barrel in which the main slaking operation is conducted. The arsenite may leave this continuous device, either in a continuous stream or intermittently, and if the proportions of the materials have been properly adjusted, the product may be at this stage sufficiently dry for passing on to the air-classifying apparatus. In the classification apparatus some moisture may be evaporated by the current of air, which will further reduce the quantity of moisture present in the product.

In some cases it is advisable to use somewhat more water in this second portion of the apparatus, since an excess of water seems to make the reaction go on more completely. Thus if desired such an amount of water may be employed in the second stage of the process as to produce a mass having a consistency say resembling putty. After the said operation it would accordingly be necessary to employ a suitable drying operation. This drying operation may if desired, be conducted by adding pulverized quick lime, or quick lime in the form of finely divided pieces, say crushed lime in which the largest pieces are about as large as kernels of corn or smaller. This lime will withdraw water from the pasty mass, to leave a pulverulent product, much of which will be in a finely divided and fluffy condition, and this material may then pass to a pulverizer and air classifying apparatus. During the operation of slaking this last portion of lime a good deal of heat will of course be given off, which may evaporate a considerable proportion of the water contained therein.

Reference was made above to the addition of the arsenic mixed with water. In some cases it may be advisable to first mix the arsenic very thoroughly with water, for example by thoroughly grinding the arsenic together with the water. The mixture of arsenic and water, with or without a colloidal material or material to act as a protective colloid can be run through a colloid mill, in order to give a very homogeneous mixture.

In producing the colloidal suspension of the arsenic, for treatment of the lime, we may use, per 100 pounds of arsenic, say about 35 to 115 parts of water, and about 3 to 10 parts of an organic material. The use of casein or calcium caseinate, soaps, fatty acids, garbage grease, albuminous compounds, saponines, concentrated licorice extract or concentrated sulfite waste liquor is suggested for this purpose. This mixture is then run through the colloid mill, producing a substantially permanent suspension of the white arsenic in the said water.

If desired the water may also carry soluble inorganic materials or other materials adapted to react with and modify the arsenic. For example copper salts, powdered sulphur, nicotine sol. etc.

The colloid mill treatment of the arsenic is regarded as of importance in the process for the reason that the arsenic so treated combines very thoroughly with the lime, when brought in contact therewith.

The lime used is preferably a light, rather porous lime, carefully burned, but not over burned. The character of the lime however when used in the continuous process as above outlined, is not of such paramount importance as in the parent case, wherein the lime is first crushed or reduced to a powder.

In some modifications of the process it may be advisable to first completely hydrate the lime, before the initial treatment with the arsenic trioxide, or suspension thereof.

In a modification of the process the lime may be first completely hydrated, then thoroughly mixed with the white arsenic, and the mixture ground together, more water being then added if desired, to produce a putty-like mass, which is subsequently dehydrated by the addition of more quick lime, say in a powdered state or a mixture of powdered and granular lime, followed by passing the mixture through a disintegrator and an air classifier if desired.

The arsenic trioxide which we prefer to use may be any of the commercial grades, either crude or resublimed but preferably should contain only a small percentage of material which does not pass through a 100 mesh screen. Any large particles of arsenic trioxide are liable not to be completely reacted upon during the period of reaction. For this reason, we recommend that the arsenic trioxide employed contain less than two per cent of material which does not pass a 100 mesh screen. It is not beyond the scope of this invention to prepare arsenite of lime from arsenic trioxide containing a considerable percentage of particles which do not pass through a 100 mesh screen. However, as a precautionary measure we recommend either that a grade of arsenic trioxide containing less than a 2 per cent residue on a 100 mesh screen be employed, or that the arsenic trioxide be ground or air-separated so as to conform to this suggestion before treatment with the water. From an economical standpoint it would probably be cheaper to separate the coarse particles of arsenic trioxide by screening or air separating machinery and then to reduce the coarse particles to the desired size. It is preferable that one, at least, of the reacting materials (calcareous material such as lime, and arsenious oxide) be in a substantially colloidally fine state of division, to produce the best results.

Regarding methods of mixing the three active ingredients: quick lime, arsenic trioxide, and water, it should be borne in mind that it is preferable to expose as large a total surface as possible to the reaction, and that it is desirable or important to secure a thorough and intimate mixture of the lime and arsenic trioxide before the end of the reaction.

In some cases it may be advisable to combine the above methods to some extent, by introducing the lime say into the continuous lime hydrator, and to then spray upon the same a solution or suspension prepared from the coarse particles of arsenic trioxide, obtained by screening, and to then add in a powdered state the remainder of the arsenic, more water being added at that stage if desired, or subsequently. In this manner the coarse arsenic trioxide does not have to be separately ground, but may be mixed with and dissolved in the water or a portion of the water to be employed in the process. In dissolving the coarse arsenic trioxide in the water, substances of an organic or inorganic nature can be added thereto which are capable of increasing the solubility of the arsenic.

In those cases where the arsenic trioxide with water is passed through a colloid mill, the substance to be added as a protective colloid may be something which will also increase the reactivity of the arsenic trioxide or something which will give a certain sticking quality to the finished powder or insecticide. Casein, glue and similar materials may be used for this purpose if desired.

With the continuous process as above indicated, the arsenic being added mixed with water in the form of a suspension, and some water being added to the initial lime, the total proportions of the materials used may be 60 parts of the commercial arsenic trioxide, about 80 to 90 parts of quick lime, and about 30 to 90 parts of water.

The discharged material can well be left exposed to the air of the room for several hours, during which time considerable moisture will evaporate from the said material due to the heat in the mass leaving the reaction vessel. The material will be very bulky and will show a high total arsenic content say 35 to 45% (figured as arsenic pentoxide), and the soluble arsenic if tested on a sample the same day may be rather high, say 1 to 2%. Several days later if again tested it may be found that the soluble arsenic has dropped down to about .5% or even lower. The apparent density of the material produced may be about .5 to .7.

Ordinarily we would recommend a total of about 42 parts of water to 60 parts of white arsenic and 85 parts of lime. In cases where the colloid mill treatment is conducted, it may be possible to slightly raise the amount of arsenic, say to 62 or 63 parts or perhaps even up to 70 parts in some cases, and to somewhat reduce the total water, say to 37 parts.

The product although appearing to be a substantially dry powder, may actually contain a considerable amount of moisture which can be driven off by heating in an oven say to 100° C., for 5 hours. Even when the amount of moisture in the product is as high as 6 or even 8%, the product may still be apparently a dry powder. While it is possible to evaporate a good deal of this moisture by treatment with hot air or the like, we prefer to avoid the expense of doing this, wherever possible.

In some cases the effect of the high temperature in the continuous reaction vessel may be increased, by external heating if desired, or the temperature may be kept by suitable heat insulation on the reaction vessel. It would be possible to increase the completeness of the reaction, by operating under high temperature and at superatmospheric pressure. This has the effect apparently of increasing the solubility of arsenic trioxide in the water employed.

It may be noted at this point that the insecticide trade in general objects to the finely divided arsenic trioxide—as for instance certain grades of Japanese arsenic—and to crude arsenic, not so much because of the small percentage of soot and other impurities which it contains, but principally because it resists wetting and tends to flocculate and collect in aggregates which cause mechanical troubles and which do not readily enter into the reaction. This property is particularly objectionable in arsenic trioxide to be used for the manufacture of arsenic acid by the nitric acid method. On the other hand, for the purpose of making arsenite of lime by means of this invention it is not only possible to use these cheaper grades of arsenic trioxide, but by reason of their fine division, they may actually be considered preferable.

In order to obtain an extremely low water-soluble arsenic content in the arsenite of lime, and to make the reaction go more nearly to completion it may be useful in some cases to dissolve as much as possible of the arsenic trioxide in the water before adding it to the lime. The amount of water required under the conditions of this invention usually varies from one-half to one and one-half times the weight of the arsenic trioxide used. It is obviously impossible to dissolve more than a small percentage of the arsenic trioxide in this amount of water. The solubility can however, be greatly increased by the addition of certain substances to the water, among others we might mention hydrochloric acid, sodium acetate, and sodium hydroxide. Hydrochloric acid would yield calcium chloride in the finished product and this compound—because of its deliquescent properties—would tend to make the arsenite of lime adhere better to the foliage, and might therefore be considered a desirable ingredient. This latter effect may be enhanced by supplying the solution of arsenic trioxide to the nozzles in the continuous reaction chamber, or continuous hydrator under superatmospheric pressure. On the other hand both the supply and the reaction chamber itself may be under pressure as above indicated.

In some cases hot air may be circulated through the continuous hydrator or other device in which the reaction is conducted, or through the portion of the apparatus in which the later stages of the process are conducted. The hot air may, if desired be heated, in part at least by the steam liberated in the high temperature part of the process. The hot air will of course more effectively remove moisture from the arsenite product.

Other factors which may tend to lower the soluble arsenic content of the final product are: finely divided raw materials, or materials which are of such a nature as to subdivide readily during the reaction; complete and rapid agitation, thorough mixing before the reaction starts and while the reaction is progressing, the presence of soluble salts in the lime or added intentionally which tend to increase the solubility of the arsenic trioxide in the water or which tend to break down flocculated colloidal aggregates which may mechanically enclose particles of arsenic trioxide (said particles being objectionable as increasing the water-soluble arsenic in the product), and the colloid mill treatment of the arsenic trioxide, or the dissolving of as much as possible of the arsenic in the water prior to the reaction, or in short any procedure which will tend to expose the maximum possible surface to the reaction.

Regarding the effect of the various modifications on the physical and chemical properties of the product, the following generalizations can probably be made:

While there is no definite exact numerical correlation between the apparent density of the quick lime used, and the arsenate of lime produced, in general we have found that the lighter and more porous limes yield a lighter and fluffier product. The lighter and more porous limes in general have a higher rate of penetration for water. That is to say, the water penetrates faster than the lime hydrates. Limes of this character yield a light and fluffy product, because such a lime usually has a high available lime content and would therefore tend to yield a greater number of particles of hydrated lime with a consequent disintegration and breaking down of aggregates during the reaction.

We consider the available lime content rather than the total lime content is a factor of importance. By available lime content we mean that portion of the total lime content which is readily soluble in water, and which is therefore capable of entering into the reaction. This can be determined by the Scaife method as adopted by the American Society for Testing Materials.

In summing up the relationship between the properties of the quick lime used and the properties of the arsenite of lime product obtained, we consider the preferable kind of quick lime is one having a low volatile content, a large percentage of pore space, a high available lime content, and ground to such size that a minimum number of aggregates of incompletely hydrated material will be obtained at the end of the reaction. The degree of grinding depends on the porosity and available lime content of the lime. In some cases it will not be necessary to grind at all, but on the other hand when using a dense of overburned lime, or one containing a high percentage of magnesia or silica, or a lime which has been underburned and contains unburned cores, it will be necessary to compensate for these undesirable properties by grinding the lime to such a state of fineness before the reaction, that no aggregates of undecomposed or vitreous material will remain at the end of the reaction. Quick lime, slaked lime and old lime which has become slaked and practically carbonated, can all be generically included under the expression "calcareous material."

We claim:—

1. In the production of arsenicals, the herein described process which comprises incorporating together calcareous material, water and acidulous arsenical material including arsenic trioxide, in such proportion as to form a wet or pasty mass, allowing reaction to go on, and thereafter incorporating quick lime in such amount as to form a dry-appearing material of low water-soluble arsenic content, adapted for use as an insecticide.

2. In the production of arsenicals, the herein described process which comprises vigorously and forcibly grinding, kneading and working together calcareaus material, water and acidulous arsenical material including arsenic trioxide, in such proportion as to form a wet or pasty mass, allowing reaction to go on, and thereafter incorporating quick lime in such amount as to form a dry-appearing material of low water-soluble arsenic content, adapted for use as an insecticide.

3. In the production of arsenicals, the herein described process which comprises incorporating together quick lime, water and acidulous arsenical material including arsenic trioxide, in such proportion as to form a wet or pasty mass, allowing reaction to go on, and thereafter incorporating quick lime in such amount as to form a dry-appearing material of low water-soluble arsenic content, adapted for use as an insecticide.

4. In the production of arsenicals, the herein described process which comprises reacting together, in the presence of aqueous liquid in amount sufficient to promote reaction, calcareous material and an aqueous liquid containing white arsenic in a substantially colloidally fine state of division, in such proportion as to form a wet or pasty mass, allowing reaction to go on, and thereafter incorporating quick lime in such amount as to form a dry-appearing material of low water-soluble arsenic content, adapted for use as an insecticide.

5. In the manufacture of insecticides, the step of mixing arsenic trioxide with enough water to form a readily flowable slurry, passing the mixture through a fine grinding mill to produce a readily flowable slurry and treating lime therewith, the total amount of lime being more than sufficient to convert the arsenic trioxide into tricalcium arsenite.

6. In the manufacture of insecticides, the step of mixing arsenic trioxide with water, passing the mixture with a preferably organic dispersing agent preferably of a colloidal nature, through a colloid mill, and thereafter reacting thereupon with lime material, the amount of water mixed with said arsenic trioxide being sufficient to entirely slake the lime.

7. The process as described which comprises continuously feeding quick lime, sprinkling the lime with a small amount of water, insufficient to wholly slake the lime, but sufficient to reduce the same to a finely divided state, continuously adding a mixture containing arsenic trioxide and water, while agitating the mass, the total amount of such added water being restricted to the amount which leaves, at the end of the process, a substantially dry-appearing product, and discharging the product as a substantially dry-appearing pulverulent product.

8. In the manufacture of insecticides, the step of bringing together lime and a colloidally fine suspension of arsenic trioxide in an aqueous liquid.

9. In the manufacture of insecticides, the step of bringing together lime and a colloidally fine aqueous suspension of arsenic trioxide, the proportion of lime to water being sufficient to leave a dry-appearing pulverulent product.

10. In the production of arsenicals, the herein described process which comprises reacting together, in the presence of aqueous liquid in amount sufficient to promote reaction, calcareous material and an aqueous liquid containing white arsenic, in a substantially collorially fine state of division, such liquid containing an organic protective colloid, the calcareous material and aqueous liquid being in such proportion as to form a wet or pasty mass, allowing reaction to go on, and thereafter incorporating quick lime in such amount as to form a dry-appearing material of low water-soluble arsenic content, adapted for use as an insecticide.

In testimony whereof we affix our signatures.

JOHN F. BLYTH.
CARLETON ELLIS.